(12) United States Patent
Letang

(10) Patent No.: US 6,274,944 B1
(45) Date of Patent: Aug. 14, 2001

(54) METHOD FOR ENGINE CONTROL

(75) Inventor: Dennis Michael Letang, Canton, MI (US)

(73) Assignee: Detroit Diesel Corporation ( * ) Notice: Subject to any disclaimer, the term of this patent is extended or adjusted under 35 U.S.C. 154(b) by 0 days.

(21) Appl. No.: 09/478,831

(22) Filed: Jan. 6, 2000

(51) Int. Cl.$^7$ .................................................. F02D 41/00
(52) U.S. Cl. ...................... 290/40 R; 290/41; 290/40 B; 123/331; 123/339.1
(58) Field of Search .................................. 290/40 R, 41, 290/40 A, 40 B, 40 C; 123/331, 339.1

(56) References Cited

U.S. PATENT DOCUMENTS

| | | | |
|---|---|---|---|
| 4,527,112 | 7/1985 | Herman | 320/61 |
| 4,542,462 | 9/1985 | Morishita et al. | 364/424 |
| 4,730,097 | 3/1988 | Campbell et al. | 219/203 |
| 5,057,764 | 10/1991 | Fujimoto et al. | 322/14 |
| 5,066,866 | 11/1991 | Hallidy | 290/1 R |
| 5,235,946 | 8/1993 | Fodale et al. | 123/339 |
| 5,263,447 | 11/1993 | Fujimoto | 123/339 |
| 5,270,575 | 12/1993 | Togai et al. | 290/40 C |
| 5,321,231 | 6/1994 | Schmalzriedt et al. | 219/497 |
| 5,402,007 | 3/1995 | Center et al. | 290/40 B |
| 5,445,128 | * 8/1995 | Letang et al. | 123/436 |
| 5,467,008 | 11/1995 | Uchinami | 322/27 |
| 5,483,927 | * 1/1996 | Letang et al. | 123/41.12 |
| 5,550,445 | 8/1996 | Nii | 318/153 |
| 5,570,001 | 10/1996 | Fenley | 322/36 |
| 5,712,786 | 1/1998 | Ueda | 364/431.07 |
| 5,764,469 | 6/1998 | Slepian et al. | 361/92 |
| 5,818,117 | * 10/1998 | Voss et al. | 290/40 A |
| 5,924,403 | * 7/1999 | Thomas | 123/300 |
| 5,987,888 | * 11/1999 | Weisman, II et al. | 60/612 |
| 5,998,881 | * 12/1999 | Wind et al. | 290/40 A |
| 6,055,812 | * 5/2000 | Trumbower | 60/612 |
| 6,121,691 | * 9/2000 | Renner | 290/40 A |
| 6,131,539 | * 10/2000 | Thomas | 123/41.15 |
| 6,164,264 | * 12/2000 | Thomas | 123/300 |
| 6,172,602 | * 1/2001 | Hasfjord | 340/438 |
| 6,189,378 | * 2/2001 | Kendrick et al. | 73/119 A |

* cited by examiner

Primary Examiner—Nicholas Ponomarenko
(74) Attorney, Agent, or Firm—Brooks & Kushman P.C.

(57) ABSTRACT

A method for controlling a vehicle including an internal combustion engine having an idle speed includes controlling the idle speed based on system voltage, and increasing the idle speed when system voltage is low and the vehicle speed status indicates that the vehicle is stationary. In some embodiments, idle speed may ramp up with current demanded engine speed while the vehicle is moving.

14 Claims, 3 Drawing Sheets

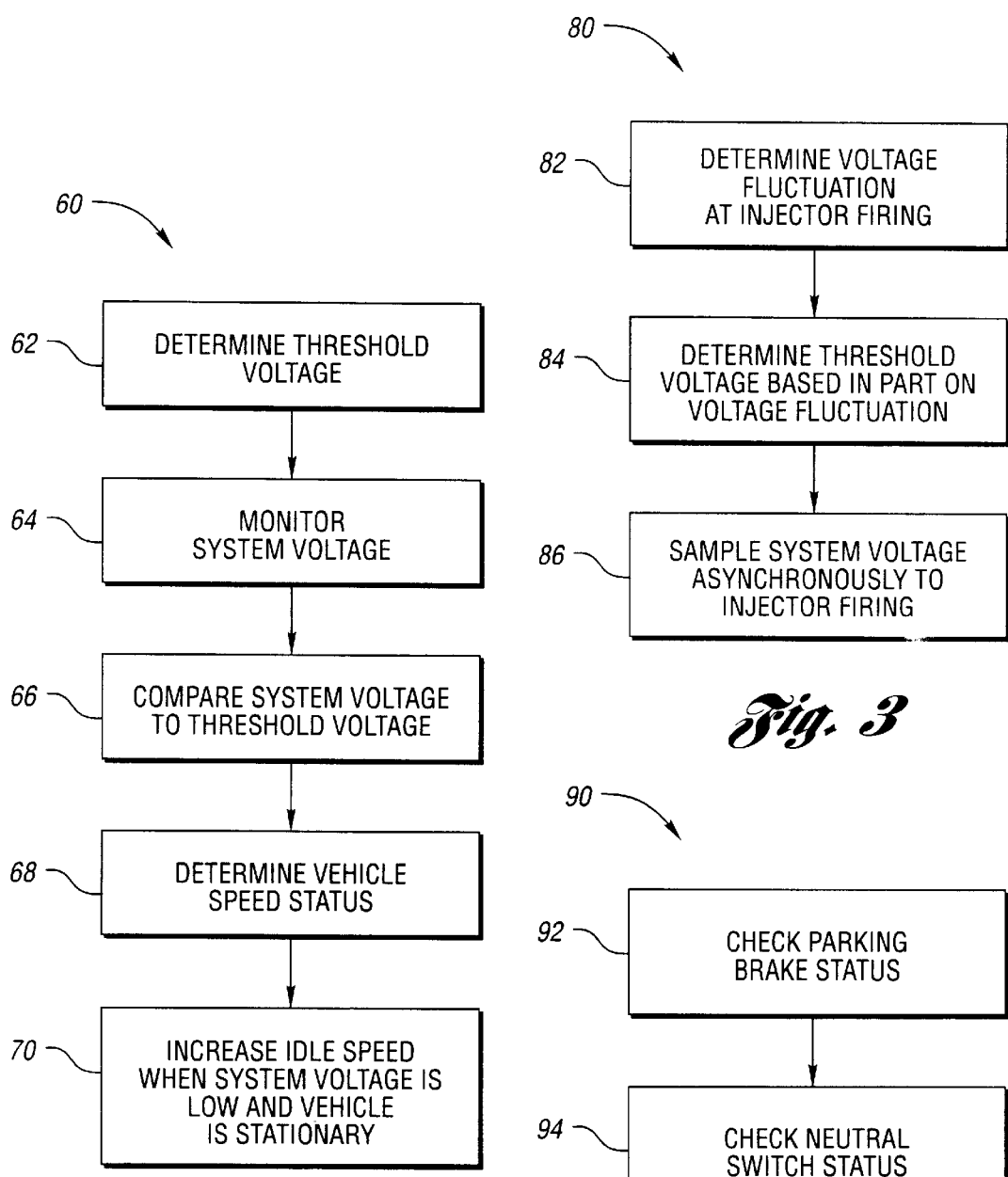

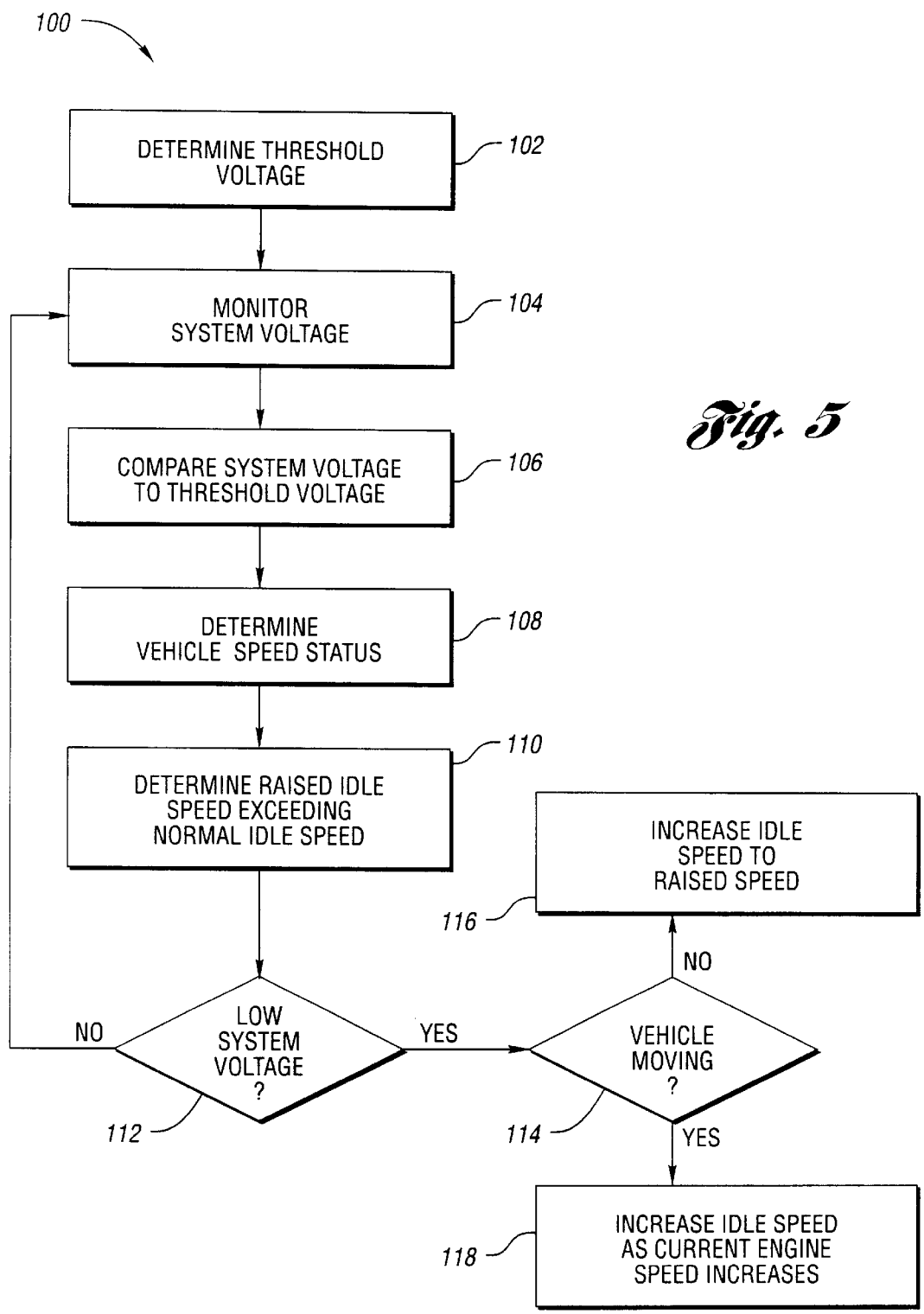

METHOD FOR ENGINE CONTROL

TECHNICAL FIELD

The present invention relates to a method for controlling a vehicle including an internal combustion engine having an idle speed, and for controlling the idle speed.

BACKGROUND ART

In the control of internal combustion engines, the conventional practice utilizes electronic control units having volatile and non-volatile memory, input and output circuitry, and a processor capable of executing an instruction set. The electronic control unit controls the various functions of the engine and associated systems. A particular electronic control unit communicates with numerous sensors, actuators, and sometimes with other electronic control units to control various functions and operating parameters of the engine. For example, an electronic control unit may control various aspects of fuel deliver, including the engine idle speed.

An existing method and apparatus for maintaining vehicle battery charge by controlling engine idle speed is described in U.S. Pat. No. 5,402,007, issued to Center et al. In this existing system, an alternator driven by the engine supplies power to drive electrical loads and to charge a vehicle battery. The system adaptively learns a system voltage set point. Thereafter, idle speed is controlled in response to the regulation state of the electrical system to preferably maintain the system in set point regulation, ensuring adequate battery charge or minimal battery discharge.

Because newer vehicles typically have greater system electrical loads than older vehicles, the details of the battery charging system are becoming more important. A higher engine idle speed may maintain battery charge during heavier electrical loads, but on the other hand, results in less fuel economy. Further, although existing battery charge maintenance systems are used in some applications that are commercially successful, the increasing electrical loads in vehicles and concerns about fuel economy create a need for an improved engine control method with more functionality in the charging subsystem than existing methods.

DISCLOSURE OF INVENTION

It is, therefore, an object of the present invention to provide a method for controlling a vehicle including an internal combustion engine having an idle speed, in which idle speed is increased when system voltage falls below a threshold and a vehicle speed status indicates that the vehicle is stationary.

In carrying out the above object and other objects and features of the present invention, a method for controlling a vehicle including an internal combustion engine is provided. The internal combustion engine has an idle speed, an alternator driven by the engine, a battery connected to the alternator, and a system voltage. The method comprises determining a threshold voltage, monitoring the system voltage, comparing the system voltage to the threshold voltage, and determining a vehicle speed status. The method further comprises controlling the idle speed based on the comparison. Controlling the idle speed includes increasing the idle speed when the system voltage falls below the threshold voltage and the speed status indicates that the vehicle is stationary.

In one suitable application, the threshold voltage is about 12.75 volts. In some embodiments, the method further comprises determining a voltage fluctuation that occurs when an injector fires, and determining the threshold voltage based in part on the voltage fluctuation.

For example, if the voltage fluctuation is 0.5 volts, and the desire is to have an average system voltage of at least 12.5 volts (meaning that a sample voltage when the injector fires would be 12.25 volts, while a sample voltage when the injector is not firing would be 12.75 volts), the voltage threshold could be set at, for example, about 12.75 volts. A voltage sample reading of 12.75 volts, if the sample was taken when an injector was not firing, means that the average system voltage is 12.5 volts. As such, system voltage may be sampled asynchronously to injector firing. Of course, in other embodiments, voltage sampling may be performed synchronously to the injector firing program such that sampling always occurs when an injector is not firing.

In some embodiments, controlling the idle speed further comprises increasing the idle speed from a normal speed to a raised speed for a limited period of time. Thereafter, the idle speed is decreased to the normal speed. In some embodiments, determining the vehicle speed status further comprises checking a parking brake status. The vehicle speed status is deemed as stationary when the parking brake status is engaged. In another implementation, a neutral switch status is checked. The vehicle speed status is deemed as stationary when the neutral switch status indicates that the vehicle is in neutral. In yet another embodiment, a vehicle speed sensor is checked. The vehicle speed status is deemed as stationary when the vehicle speed sensor indicates that the vehicle is stationary. Of course, a combination of items could be checked to determine the vehicle speed status.

Further, in carrying out the present invention, a method for controlling a vehicle including an internal combustion engine having a normal idle speed is provided. The method comprises determining a threshold voltage, monitoring the system voltage, comparing the system voltage to the threshold voltage, and determining a vehicle speed status. The method further comprises determining a raised idle speed that is greater than the normal idle speed. The idle speed is controlled based on the voltage comparison. The engine idle speed is increased when the system voltage falls below the threshold. The idle speed is increased from the normal idle speed to the raised idle speed when the speed status indicates that the vehicle is stationary.

In a preferred embodiment, the method further comprises determining a current engine speed. Controlling the idle speed based on a comparison includes increasing the engine idle speed when the system voltage falls below the threshold. The idle speed is increased to a lesser speed of the current engine speed and the raised idle speed when the speed status indicates that the vehicle is moving. This allows the idle speed to increase with the current engine speed up to the raised idle speed and then remain at the raised idle speed for a period of time, independent of the current engine speed. That is, when a vehicle is stationary, the idle speed may be immediately raised to the raised idle speed. On the other hand, when the vehicle is moving, the idle speed ramps up as the operator increases the current engine speed, and thereafter, when the engine returns to an idle state, the idle speed is the raised idle speed. As such, current engine speed may exceed idle, but upon the engine returning to an idle state, the engine idles at raised idle.

Still further, in carrying out the present invention, a computer readable storage medium is provided. The computer readable storage medium includes instruction stored on the medium. The instructions are executable by an engine controller to control a vehicle including an internal combustion engine having an idle speed. The storage medium further comprises instructions for establishing a threshold voltage, instructions for monitoring the system voltage, instructions for comparing the system voltage to the threshold voltage, and instructions for determining a vehicle speed status. The storage medium further comprises instructions for controlling the idle speed based on the comparison. The idle speed is increased when the system voltage falls below the threshold voltage and the speed status indicates that the vehicle is stationary.

The advantages associated with the present invention are numerous. For example, embodiments of the present invention reduce the potential for unintended vehicle acceleration. That is, because the increase in an engine idle speed may be a significant engine RPM increase, such as a few hundred RPM, embodiments of the present invention determine that the vehicle is stationary before increasing the idle speed. On the other hand, some embodiments of the present invention allow the idle speed to increase when the vehicle is moving, but these embodiments ramp up the idle speed as the current engine speed increases up to and beyond the raised idle speed.

Thereafter, when the current engine speed, as demanded by the operator, reduces to an idle state, the vehicle idles at the raised idle speed. Further, preferred embodiments of the present invention advantageously maintain the idle speed at the raised idle speed for a period of time. As such, if the vehicle operator takes the vehicle out of idle, upon returning to idle, idle speed is still the raised idle speed until the set time period expires.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a block diagram of a method of the present invention;

FIG. 3 is a block diagram of a preferred implementation of the method of the present invention;

FIG. 4 is a block diagram illustrating alternative ways for detecting a stationary vehicle in accordance with the present invention; and FIG. 5 is a block diagram illustrating a preferred embodiment of the present invention that adjusts idle speed in different ways depending on whether the vehicle is stationary or moving.

BEST MODE FOR CARRYING OUT THE INVENTION

Figure 1:
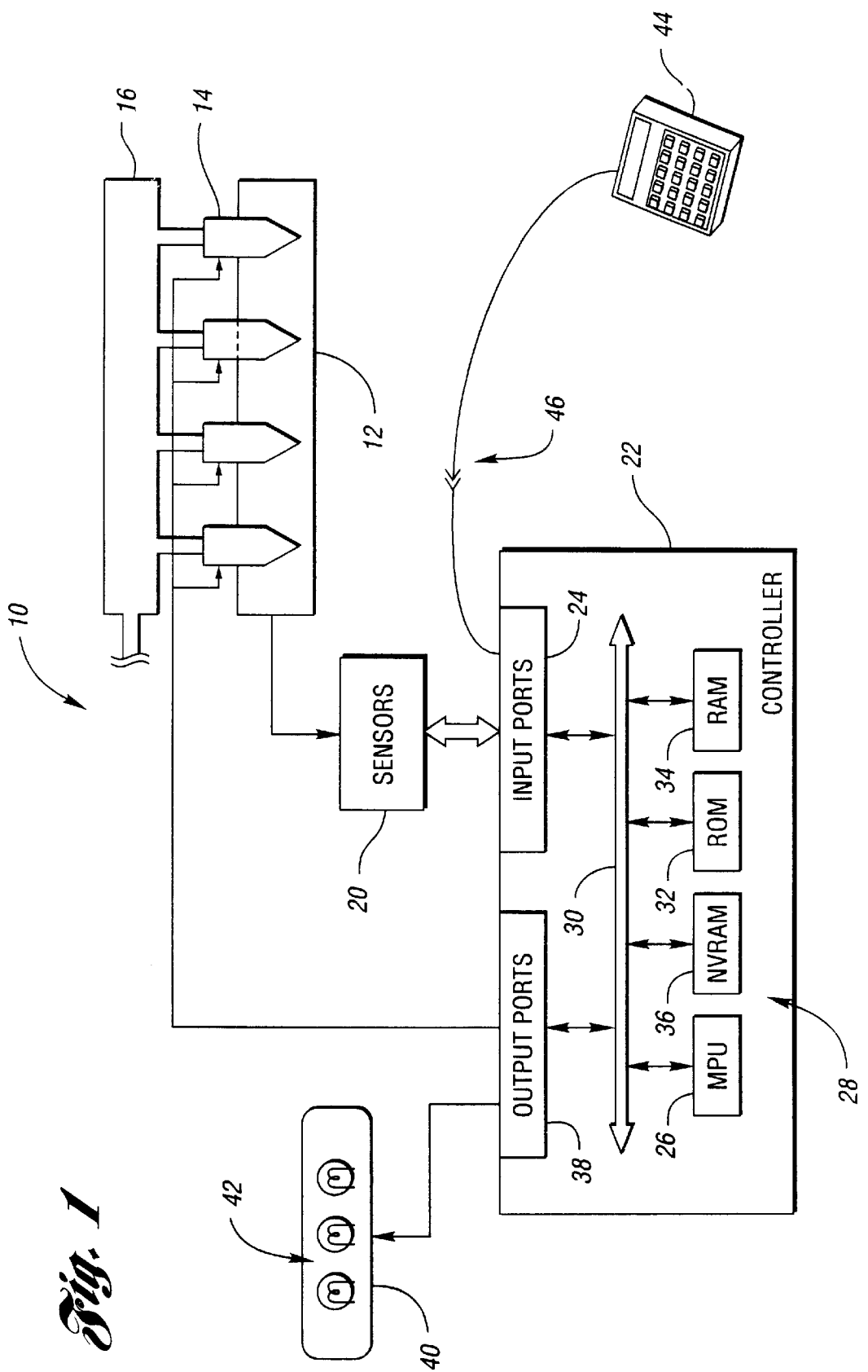
FIG. 1 is a schematic diagram of a system for controlling a vehicle including an internal combustion engine having an idle speed.

Referring to FIG. 1, a system for controlling a vehicle is shown. The system, generally indicated at 10, includes an internal combustion engine 12. Engine 12 has a plurality of cylinders. Each cylinder is fed by a fuel injector 14, or alternatively by a common rail. In a preferred embodiment, engine 12 is a compression-ignition internal combustion engine. Fuel injectors 14 receive pressurized fuel from a supply 16 connect to one or more pumps (not shown) as is well know in the art. Alternatively, embodiments of the present invention may employ a plurality of unit pumps (not shown), each pump supplying fuel to one of the injectors 14.

System 10 includes various sensors 20 for generating signals indicative of corresponding operational conditions or parameters of engine 12, and other vehicular components. Sensors 20 are in electrical communication with a controller 22 via input ports 24. Controller 22 preferably includes a microprocessor 26 in communication with various computer readable storage media 28 via data and control bus 30. Of course, embodiments of the present invention are not limited to any particular controller or architecture. Media 28 may include any of a number of known storage devices such as, for example, read-only memory (ROM) 32 random access memory (RAM) 34 and non-volatile random access memory (NVRAM) 36, including programmable devices such as, for example, programmable read only memory (PROM), erasable programmable read only memory (EPROM), and electronically erasable programmable read only memory (EEPROM).

Computer readable storage media 28 and processor 26 cooperate to implement control logic in the form of instructions executed by controller 22. Of course, the control logic representing the instructions may take many forms including, for example, software, firmware, hardware, including discrete or integrated circuitry, and even microcode. Controller 22 executes the instructions represented by the control logic to control various systems and subsystems of the vehicle, such as engine 12. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables, control logic, look-up table values, including idle speed settings and system voltage threshold values.

In operation, controller 22 receives signals from sensors 20 and executes control logic in the form of instructions to control engine 12. Embodiments of the present invention advantageously control the idle speed of engine 12 based on a comparison of the system voltage to a threshold voltage. Idle speed is increased when system voltage falls below the threshold voltage. The manner in which the idle speed is increased depends on the vehicle speed status being stationary or moving. In a preferred embodiment, when a vehicle is stationary, idle speed is immediately increased from the normal speed to a raised idle speed. On the other hand, when the vehicle speed status indicates that the vehicle is moving, the idle speed is allowed to ramp up as the operator demands increased engine speed such that an unintended vehicle acceleration is avoided. When the vehicle is allowed by the operator to return to idle, the vehicle idles at the raised idle speed.

As will be appreciated by one of ordinary skill in the art, the control logic, including the instructions, may be implemented in any one or combination of a variety of control logic methodologies. The various functions are preferably provided by a microprocessor in combination with instructions stored in memory. Further, as is appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine. Likewise, parallel processing or multi-tasking systems and methods may be used to accomplish features, and advantages of the present invention. The present invention is independent of the particular programming language, operating system or processor used to implement the control logic illustrated.

Referring to FIG. 2, a block diagram illustrating a method of the present invention is generally indicated at 60. Occasionally, the vehicle charging system cannot provide an adequate charge to the vehicle battery or batteries. That is, the alternator output or system voltage begins to fall, possibly due to one or more factors such as, for example, high electrical load, corroded wires, slipping alternator belt, etc. When a charging system is working properly, the system voltage should be at the voltage set point for the system. Of course, it is appreciated that the system voltage may be measured from a variety of places in the electrical system, but is usually measured at the battery positive terminal. In one suitable implementation in which the inventor foresees application of an embodiment of the present invention, when the charging system is working properly, the voltage right at the battery should be approximately 14.2 volts. When the charging system, in the exemplary system, cannot supply at least 12.5 volts, the battery will begin to discharge. Of course, this is just one example, and particular voltage values may have other values in other electrical systems (such as, for example, a 24 volt system) as is appreciated by those of ordinary skill in the electrical arts. Embodiments of the present invention detect when a charging system is not capable of providing an adequate charge, and raise the engine idle speed to attempt to increase the alternator output.

In FIG. 2, at block 62, a voltage threshold is determined. At block 64, a system voltage is monitored. At block 66, system voltage is compared to threshold voltage. And at block 68, the vehicle speed status is determined. That is, the threshold voltage is the minimum system voltage desired so that battery charge does not rapidly drain. At block 70, idle speed is increased when the system voltage is low and the vehicle is stationary. Because the alternator is driven by the engine, alternator output is strongly related to engine speed (RPM).

Advantageously, unlike existing systems, embodiments of the present invention check that the vehicle is stationary prior to producing an immediate, significant, increase in the idle speed of the engine. That is, determining that the vehicle is not moving before raising the idle speed avoids unintended vehicle acceleration. For example, if the driver is creeping along in heavy traffic on the idle governor and a low battery voltage is detected, idle speed is not immediately raised to the raised idle speed so that a rapid increase in vehicle speed is avoided. Advantageously, checking for a stationary vehicle prior to increasing idle speed allows a moderate to large RPM increase to be used, such as a several hundred RPM increase.

As shown in FIG. 3, generally indicated at 80, some embodiments of the present invention are adapted for vehicles in which there is a significant system voltage fluctuation at each injector firing. That is, in some vehicles, every time an injector fires, the battery voltage can drop as much as, for example 0.5 volts. At block 82, a voltage fluctuation at injector firing is determined. At block 84, the threshold voltage is determined based in part on the voltage fluctuation. That is, in the exemplary system described above in which the charging system needs to supply at least 12.5 volts to the battery before the battery begins to discharge, the voltage threshold may be set at 12.75 volts. As such, at block 86, a system voltage may be sampled asynchronously to injector firing. The threshold of 12.75 volts compensates for not knowing if sampling occurred at the same time as the injector fired. Further, preferred embodiments of the present invention require that the system voltage is below the voltage threshold for a predetermined period of time prior to raising the idle speed. Further, preferred systems require that the idle speed remains raised for a predetermined period of time. This prevents rapid toggling of the idle speed from a normal value to the raised value.

As best shown in FIG. 4, many techniques can be used to determine whether or not the vehicle is stationary. For example, at block 92, parking brake status could be checked. On the other hand, a neutral switch status could be checked (block 94), and/or a vehicle speed sensor could be checked (block 96). In accordance with some embodiments of the present invention, if the engine is idling and a low battery voltage condition exists and the vehicle is stationary, the idle speed is increased to a raised idle speed. In one example, in which the engine has an operating range from a normal idle of 600 RPM to a full throttle of about 2,100 RPM, a suitable raised idle speed (which is a calibratable value) is 1,100 RPM. As mentioned previously, once idle speed is raised to the raised value, idle speed remains at the raised value for a period of time, for example, twenty minutes. To detect a stationary vehicle, the controller could look at parameters such as, but not limited to, parking brake status, vehicle speed, neutral switch status and/or torque. Since the vehicle is stationary, raising the idle speed will not cause an unintended vehicle acceleration.

In other embodiments of the present invention, vehicle idle speed may be raised when the vehicle is not stationary. That is, advantageously, embodiments of the present invention avoid unintended vehicle acceleration by checking for stationary vehicle before causing a significant and immediate increase in engine RPM. On the other hand, when the vehicle is moving, idle RPM is ramped up as the current engine RPM demanded by the operator increases, and thereafter, when the vehicle is returned to an idle state, the vehicle idles at the raised idle. As best shown in FIG. 5, a method of the present invention that allows idle speed to be increased for both stationary and moving vehicles is generally indicated at 100.

In this preferred embodiment, at block 102, a threshold voltage is determined. At block 104, a system voltage is monitored. At block 106, system voltage is compared the to threshold voltage. At block 108, a vehicle speed status is determined as moving or stationary. At block 110, a raised idle speed exceeding normal idle speed is determined. Of course, a suitable implementation of the present invention has the raised idle speed stored at the engine controller as a calibrated value. Other embodiments of the present invention may dynamically determine the raised idle speed based on, for example, the difference between the threshold voltage and the system voltage.

At decision block 112, it is checked to see if the system voltage is low. When voltage is not excessively low, flow continues back to block 104. Preferably, although not specifically illustrated, it is necessary that the system voltage be low for a preestablished period of time prior to flow passing to block 114. At decision block 114, vehicle speed status is checked. When the vehicle is not moving, flow proceeds to block 116. At block 116, idle speed is increased to the raised idle speed. Because the vehicle is stationary, unintended vehicle acceleration is avoided and the idle speed is raised to attempt to charge up the battery by increasing alternator output. When a vehicle is moving, flow proceeds to block 118. At block 118, idle speed is increased as current engine speed increases. That is, idle speed is increased to the lessor of the current engine speed and the raised idle speed. Idle speed is allowed to increase as the current engine speed increases toward the raised idle speed. When current engine speed reaches the raised idle speed, the engine idle speed is set as the raised idle speed. Thereafter, current engine speed may increase beyond the raised idle speed, but when the engine returns to idle, the engine idles at the raised idle speed.

In an example, if the engine is not idling, or the vehicle is not stationary and a low battery voltage condition exists, the desired idle speed, that is the idle speed that will be used when an idle condition occurs, can be set to the minimum of (for example) 1,100 RPM and the current engine speed. The desired idle speed will be allowed to increase as the engine speed increases to a maximum of 1,100 RPM. Since the current engine speed is not increased, this will not cause an unintended vehicle acceleration. When there is no longer an acceleration request, the engine would run at the new desired idle speed instead of a typical 600 RPM. After a preestablished period of time, the idle speed returns to the normal idle speed of 600 RPM.

The timer that keeps the idle speed raised for the preestablished period of time works to ensure that the engine speed does not drop below idle speed for the set period of time even if the vehicle is no longer idling. For example, if a vehicle is stationary and the controller detects a low battery voltage, the idle speed is raised to 1,100 RPM. After five minutes of fast idle (when the preestablished period is twenty minutes) the driver starts driving the vehicle. During the next fifteen minutes of engine operation, the engine speed will not be allowed to drop below 1,100 RPM if the driver puts the vehicle back in an idle state. Of course, the voltages and engine speeds above are exemplary, and other values may be suitable in different applications.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling a vehicle including an internal combustion engine having an idle speed, an alternator driven by the engine, a battery connected to the alternator, and a system voltage, the method comprising:

determining a threshold voltage;

monitoring the system voltage;

comparing the system voltage to the threshold voltage;

determining a vehicle speed status; and controlling the idle speed based on the comparison, including increasing the idle speed when the system voltage falls below the threshold voltage and the speed status indicates that the vehicle is stationary;

wherein the engine includes an injector and determining the threshold voltage further comprises:

determining a voltage fluctuation that occurs when the injector fires; and determining the threshold voltage based in part on the voltage fluctuation.

2. The method of claim 1 wherein the threshold voltage is about 12.75 volts.

3. The method of claim 1 wherein monitoring the system voltage further comprises:

sampling the system voltage asynchronously to injector firing.

4. The method of claim 1 wherein monitoring the system voltage further comprises:

sampling the system voltage synchronously to injector filing.

5. The method of claim 1 wherein controlling the idle speed further comprises:

increasing the idle speed from a normal speed to a raised speed for a limited period of time; and thereafter, decreasing the idle speed to the normal speed.

6. The method of claim 1 wherein determining the vehicle speed status further comprises:

checking a parking brake status, and deeming the vehicle speed status as stationary when the parking brake status is engaged.

7. The method of claim 1 wherein determining the vehicle speed status further comprises:

checking a neutral switch status, and deeming the vehicle speed status as stationary when the neutral switch status indicates that the vehicle is in neutral.

8. The method of claim 1 wherein determining the vehicle speed status further comprises:

checking a vehicle speed sensor, and deeming the vehicle speed status as stationary when the vehicle speed sensor indicates that the vehicle is stationary.

9. A method for controlling a vehicle including an internal combustion engine having a normal idle speed, an alternator driven by the engine, a battery connected to the alternator, and a system voltage, the method comprising:

determining a threshold voltage;

monitoring the system voltage;

comparing the system voltage to the threshold voltage;

determining a vehicle speed status;

determining a raised idle speed that is greater than the normal idle speed; and controlling the idle speed based on the comparison, including increasing the engine idle speed when the system voltage falls below the threshold, the idle speed being increased from the normal idle speed to the raised idle speed when the speed status indicates that the vehicle is stationary;

wherein controlling the idle speed further comprises:

determining a current engine speed; and controlling the idle speed based on the comparison, including increasing the engine idle speed when the system voltage falls below the threshold, the idle speed being increased to a lessor speed of the current engine speed and the raised idle speed when the speed status indicates that the vehicle is moving, allowing the idle speed to increase with the current engine speed up to the raised idle speed and then remain at the raised idle speed for a period of time, independent of the current engine speed.

10. A computer readable storage medium including instructions stored on the medium, the instructions being executable by an engine controller to control a vehicle including an internal combustion engine having an idle speed, an alternator driven by the engine, a battery connected to the alternator, and a system voltage, the storage medium further comprising:

instructions for establishing a threshold voltage;

instructions for monitoring the system voltage;

instructions for comparing the system voltage to the threshold voltage;

instructions for determining a vehicle speed status; and instructions for controlling the idle speed based on the comparison, including increasing the idle speed when the system voltage falls below the threshold voltage and the speed status indicates that the vehicle is stationary;

wherein the engine includes an injector, and the instructions for determining the threshold voltage further comprise:

instructions for determining a voltage fluctuation that occurs when the injector fires; and instructions for determining the threshold voltage based in part on the voltage fluctuation.

11. The medium of claim 10 wherein the threshold voltage is about 12.75 volts.

12. The medium of claim 10 wherein the instructions for monitoring the system voltage further comprise:

instructions for sampling the system voltage asynchronously to injector firing.

13. The medium of claim 10 wherein the instructions for monitoring the system voltage further comprise:

instructions for sampling the system voltage synchronously to injector firing.

14. A medium for controlling a vehicle including an internal combustion engine having a normal idle speed, an alternator driven by the engine, a battery connected to the alternator, and a system voltage, the medium comprising:

instructions for determining a threshold voltage;

instructions for monitoring the system voltage;

instructions for comparing the system voltage to the threshold voltage;

instructions for determining a vehicle speed status;

instructions for determining a raised idle speed that is greater than the normal idle speed; and instructions for controlling the idle speed based on the comparison, including increasing the engine idle speed when the system voltage falls below the threshold, the idle speed being increased from the normal idle speed to the raised idle speed when the speed status indicates that the vehicle is stationary;

wherein the instructions for controlling the idle speed further comprise:

instructions for determining a current engine speed; and instructions for controlling the idle speed based on the comparison, including increasing the engine idle speed when the system voltage falls below the threshold, the idle speed being increased to a lessor speed of the current engine speed and the raised idle speed when the speed status indicates that the vehicle is moving, allowing the idle speed to increase with the current engine speed up to the raised idle speed and then remain at the raised idle speed for a period of time, independent of the current engine speed.

* * * * *